United States Patent
Fung et al.

(10) Patent No.: US 12,453,490 B2
(45) Date of Patent: Oct. 28, 2025

(54) SYSTEMS, DEVICES, AND METHODS FOR REMOTE COLLECTION OF BIOMETRIC DATA AND SPECIMEN SAMPLE WITH IDENTITY VERIFICATION OF COLLECTOR

(71) Applicant: THE KIT COMPANY LLC, New York, NY (US)

(72) Inventors: Philip Fung, San Francisco, CA (US); Reshma Ebberson, San Francisco, CA (US); Lakshminarayan Srinivasan, San Francisco, CA (US)

(73) Assignee: THE KIT COMPANY LLC, New York, NY (US)

( * ) Notice: Subject to any disclaimer, the term of this patent is extended or adjusted under 35 U.S.C. 154(b) by 582 days.

(21) Appl. No.: 17/762,002

(22) PCT Filed: Sep. 18, 2020

(86) PCT No.: PCT/US2020/051650
§ 371 (c)(1),
(2) Date: Mar. 18, 2022

(87) PCT Pub. No.: WO2021/055867
PCT Pub. Date: Mar. 25, 2021

(65) Prior Publication Data
US 2022/0369953 A1   Nov. 24, 2022

Related U.S. Application Data

(60) Provisional application No. 62/931,593, filed on Nov. 6, 2019, provisional application No. 62/902,810, filed on Sep. 19, 2019.

(51) Int. Cl.
*A61B 5/117*   (2016.01)
*A61B 50/30*   (2016.01)
(Continued)

(52) U.S. Cl.
CPC .............. *A61B 5/117* (2013.01); *A61B 50/30* (2016.02); *A61B 90/96* (2016.02); *G01G 19/50* (2013.01);
(Continued)

(58) Field of Classification Search
CPC ......... A61B 5/117; A61B 50/30; A61B 90/96; G01G 19/50; G06Q 50/265; G06Q 10/10;
(Continued)

(56) References Cited

U.S. PATENT DOCUMENTS

| | | | |
|---|---|---|---|
| 9,636,062 B2 * | 5/2017 | Holmes | A61B 10/0096 |
| 2005/0106608 A1 * | 5/2005 | Sangha | B01L 3/508 |
| | | | 435/6.12 |

(Continued)

FOREIGN PATENT DOCUMENTS

WO   WO 2013/119646 A1   8/2013

OTHER PUBLICATIONS

International Search Report and Written Opinion mailed Feb. 12, 2021, for International Application No. PCT/US2020/051650, 11 pages.
(Continued)

*Primary Examiner* — David J Bolduc
(74) *Attorney, Agent, or Firm* — Norris McLaughlin, P.A.

(57) ABSTRACT

Methods and kits for collecting and verifying a specimen and/or biological information from a person at a first location to be provided to a second location are provided with documentation of chain of custody in order to verify that the person from whom the specimens and data were obtained is the intended person. Methods include internet and/or video communication between the person and a human or software-based verification assistant, confirming identification of the person to the verification assistant through the video communication, obtaining one or more specimens from the
(Continued)

person or one or more types of biological information of the person, wherein the obtaining may be recorded through the internet/video communication, and the use and recording of coded tamper-evident packaging to ensure chain of custody before, during and after the internet/video communication.

39 Claims, 5 Drawing Sheets

(51) Int. Cl.
*A61B 90/96* (2016.01)
*G01G 19/50* (2006.01)
*G06Q 50/26* (2012.01)
*G16H 10/40* (2018.01)
*G16H 40/20* (2018.01)
*G01N 1/00* (2006.01)
*G01N 1/28* (2006.01)

(52) U.S. Cl.
CPC ............ *G06Q 50/265* (2013.01); *G16H 10/40* (2018.01); *G16H 40/20* (2018.01); *G01N 2001/005* (2013.01); *G01N 2001/007* (2013.01); *G01N 1/28* (2013.01)

(58) Field of Classification Search
CPC .......... G16H 10/40; G16H 40/20; G01N 1/28; G01N 2001/005; G01N 2001/007
See application file for complete search history.

(56) References Cited

U.S. PATENT DOCUMENTS

| | | |
|---|---|---|
| 2006/0111620 A1* | 5/2006 | Squilla ................... A61B 5/00 600/300 |
| 2007/0073113 A1 | 3/2007 | Squilla et al. |
| 2008/0274459 A1* | 11/2008 | Zylberberg ............ G16B 50/30 435/6.1 |
| 2011/0144454 A1 | 6/2011 | Koester |
| 2013/0080071 A1* | 3/2013 | Holmes .................. G16B 50/00 702/19 |
| 2013/0173287 A1* | 7/2013 | Cashman ............... H04N 7/141 705/2 |
| 2014/0052463 A1 | 2/2014 | Cashman et al. |
| 2014/0323913 A1 | 10/2014 | Holmes et al. |
| 2014/0335505 A1* | 11/2014 | Holmes .................. G16H 10/40 435/6.12 |
| 2015/0176055 A1* | 6/2015 | Knapp, Jr. ................. B01L 1/52 435/6.1 |
| 2016/0085913 A1* | 3/2016 | Evans .................... G16H 30/00 705/3 |
| 2016/0287156 A1* | 10/2016 | McHale ............ A61B 5/15186 |
| 2017/0302880 A1 | 10/2017 | Cizerle |
| 2017/0329935 A1* | 11/2017 | Holmes .................. G01N 33/50 |
| 2020/0152339 A1* | 5/2020 | Pulitzer .................. G16H 50/70 |
| 2022/0223300 A1* | 7/2022 | Ferro, Jr. .................. G06T 7/70 |

OTHER PUBLICATIONS

International Preliminary Report on Patentability mailed Mar. 15, 2022, for International Application No. PCT/US2020/051650, 8 pages.

\* cited by examiner

1. Phone Stand

2. Fingerprick Kit

3. Saliva Kit

4. Scale

5. Blood Pressure Monitor

6. Urine specimen cup

7. Return Mailer

Component 1: ID check

Component 2: Video chat-supervised blood, saliva, and urine collection

Component 5: Verification match

Component 2: Video chat supervised blood pressure and weight check

Component 5: DNA identity specimen match

Component 3,4: Tamper evident containers

SYSTEMS, DEVICES, AND METHODS FOR REMOTE COLLECTION OF BIOMETRIC DATA AND SPECIMEN SAMPLE WITH IDENTITY VERIFICATION OF COLLECTOR

This application claims priority to and the benefit of U.S. Provisional Application No. 62/902,810 filed on Sep. 19, 2019 and U.S. Provisional Application No. 62/931,593 filed on Nov. 6, 2019, the entire contents of both of which are incorporated herein by reference.

FIELD OF THE INVENTION

The field of the invention is a system, device, and method for remotely collecting one or more specimens and/or biological information from an intended person with verification that the user of the system and method is the intended person and the specimens and/or biological information collected are from the intended person.

BACKGROUND

The following description includes information that may be useful in understanding the present invention. It is not an admission that any of the information provided herein is prior art or relevant to the presently claimed invention, or that any publication specifically or implicitly referenced is prior art.

Insurance is priced based on known properties of the insured. For example, life insurance monthly premium for a healthy 40 year-old male may be $30 per month, but for a 40 year-old male with diabetes, it is likely higher, e.g., $60 per month. The underwriting process models the risk based on known factors and prices accordingly. For pricing insurance or otherwise managing insurance products, for example life insurance and health insurance, providers often need vital signs like blood pressure, health data (e.g., weight), and blood test data (e.g., hemoglobin A1c level, cholesterol level, smoking status, and/or HIV status). For most insurance policies, a person who has a healthy weight, blood pressure and lab values will pay a lower premium than those who are overweight, have high blood pressure, and/or have problematic lab test data.

Unfortunately, collecting data like weight, blood pressure, and blood test data in an accurate and authenticated way remains a challenge. Typically, phlebotomists are sent to a patient's home to do a medical exam on behalf of insurance providers. However, a phlebotomist visit has several possible limitations: added cost for travel and phlebotomist's time, lack of availability of workers near the patient, inconvenience of scheduling for the customer and the service provider, customer privacy concerns over a home visit, and customer fear of traditional phlebotomy.

Furthermore, with the onset of a pandemic like the recent COVID-19 virus, the risk of exposure to the health care professional and/or the patient during a professionally administered sample collection procedure is an additional and not insignificant disadvantage.

The many disadvantages of professionally administered sample collection favors the concept of an at-home, self-collected test. However, self-collected samples and tests solve some limitations, but introduces others, most notably the possibility of fraud. If a patient is unhealthy, he/she may also be inclined to use fraudulent specimens (e.g., if the patient is using illegal drugs, he/she may purchase drug-free urine and pass that as their own sample) in order to get a lower insurance rate than their health allows. Similarly, a person may have reason to test either positive or negative for an infection (e.g., the COVID-19 coronavirus) to benefit from a situation including avoiding work or obtaining a benefit designated for testing positive or negative for the virus.

Accordingly, there is still a need for a system that allows for verified self-administered specimen and data collection from a person that can then be provided for analysis.

SUMMARY OF THE INVENTION

The contemplated subject matter includes a system for a person to provide biological data using a self-administered method and kit with verification that the biological data was obtained from the intended person in a way that does not require in-person, professional administration.

More specifically, the inventive subject matter provides methods and kits for collecting a specimen and/or biological information from a person at a first location to be provided to a second location with the person being verified as the intended person. In a typical embodiment, the method includes establishing a video communication between the person and a verification program through a computer or smartphone. Through the video communication, identification of the person at the first location is confirmed to a verification assistant/assistance through the video communication. Additionally, the method includes obtaining one or more specimens from the person or one or more types of biological information of the person, wherein the obtaining the one or more specimens of the person includes at least one of: i) videoing the person while obtaining the one or more specimens and videoing the obtained one or more specimens being placed into a coded tamper-evident sample container; ii) before the obtaining, electronically communicating/videoing a code on a collection device and/or videoing the removal of a collection device from a coded tamper-evident container or iii) videoing the one or more obtained specimens being placed in a coded tamper-evident sample container, and wherein obtaining at least one type of biological information of the person includes videoing the person while obtaining at least one type of biological information of the person.

In another embodiment, a method for collecting a specimen and/or biological information from a person at a first location to be provided to a second location includes establishing an internet communication between the person and a verification assistant or a verification assistance program, confirming identification of the person to the verification assistant through the internet communication, before the obtaining, videoing a code on a collection device and/or videoing the removal of a collection device from a coded tamper-evident container; and then obtaining one or more specimens from the person or one or more types of biological information of the person, wherein the obtaining the one or more specimens of the person comprises placing the one or more obtained specimens in a coded tamper-evident sample container, and wherein the obtaining the at least one type of biological information of the person includes videoing the person through the internet communication while obtaining the at least one type of biological information of the person.

In some embodiments, the internet communication comprises a video communication received by the verification assistant and non-video content received by the person (e.g., user).

In some embodiments, confirming the identification of the person to the verification assistant through the internet communication, comprises the person/user providing identifying information that is received and confirmed through the internet communication. In some embodiments, the identifying information includes a unique code from a provided kit and/or an image capture of a form of identification, including a government-issued identification card, driver's license, or any identifying pages of a passport.

The contemplated subject matter also includes a kit for collecting a verified specimen and/or verified biological information from a person at a first location to be provided to a second location. Typically, the kit includes a unique code labeled on the kit corresponding to an intended person for the kit, written instructions for establishing communication with a verification assistant, at least one of a blood extraction device, mucosal (e.g. nasal swab) collection device, a saliva collection device, a stool sample device, a hair sample vessel, a blood pressure monitor, and a weighing scale.

Various objects, features, aspects and advantages of the inventive subject matter will become more apparent from the following detailed description of preferred embodiments, along with the accompanying drawing figures.

DETAILED DESCRIPTION

Figure 1:
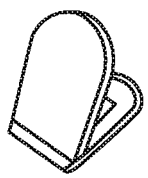
FIG. 1. is a schematic of contents/components found in an exemplary kit, as indicated (1. phone stand, 2. fingerprick assembly, 3. saliva collection device, 4. weight scale, 5. blood pressure device, 6. urine specimen, 7. return mailing or transport package), according to embodiments of the present invention.
Figure 1:
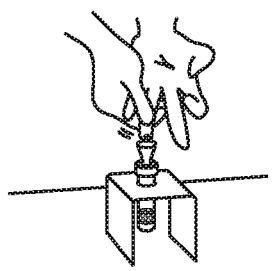
Figure 1:
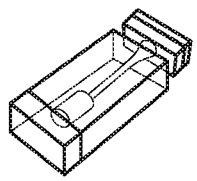
Figure 1:
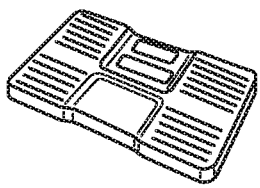
Figure 1:
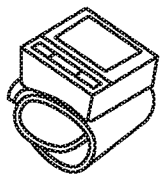
Figure 1:
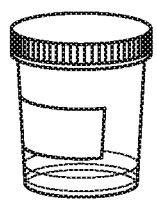
Figure 1:
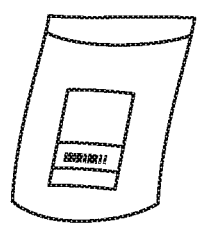

Advantageously, the inventive subject matter allows a user ("the intended person") to collect specimens and perform basic health checks on his/her own (e.g., at home), guided by assistance through a software program application and/or a video communication with biometric identity verification having anti-fraud and chain of custody methods. With reference to FIG. 1, a kit is provided to the user in it all the materials needed to obtain biological data and sample specimens (e.g., blood pressure reading, weight reading, and blood, saliva, mucosal, and/or urine self-collection), with the materials sent via mail/courier and the specimens returned via mail/courier or transported by the user. This allows for reduced cost, reduced customer friction, and increased speed of testing without compromise to fraud and chain of custody, and in so doing improves the speed, customer satisfaction, fraud prevention, and price at which policies are offered.

As used herein, "intended person" refers to the person from whom the biological data and specimens are to be obtained The intended person is the person whose name is registered to receive the biological data and specimen collection kit. The intended person may also be referred to as the user or patient.

As used herein "first location" refers to the location where the intended person obtains and collects the biological data and specimens following the instructions of the kit.

As used herein, "second location" refers to a location other than the first location where the collected specimens are sent for analysis or where the biological data is sent.

As used herein, "assistant", "verification assistant", "assistance" may refer to a human assistant, a virtual assistant, and/or virtual assistance in the form of a software application program that includes audio and video instructions for the intended person to use for effective and valid collection of specimens and biological data from the intended person.

In some embodiments, the system includes four subsystems, all of which together provide a verified biological data and specimen collection. With reference to FIGS. 2-5, the four subsystem steps include: (1) the registration and tracking system, (2) the video communication system, (3) the collection kit, and (4) the lab analysis process that handles the specimens.

(1) Registration and Tracking System

Figure 2:
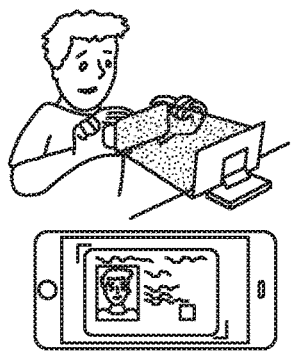
FIG. 2. outlines exemplary authentication techniques set forth as Components 1, 2, 3, 4, and 5 to ensure the authenticity of samples as disclosed herein according to embodiments of the present invention.
Figure 2:
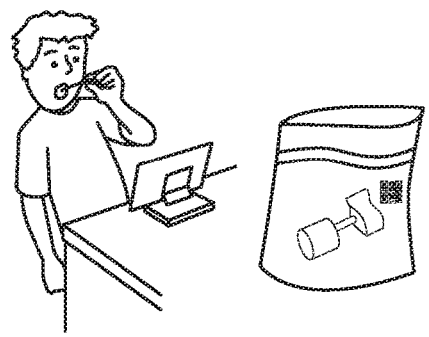
Figure 2:
Figure 2:
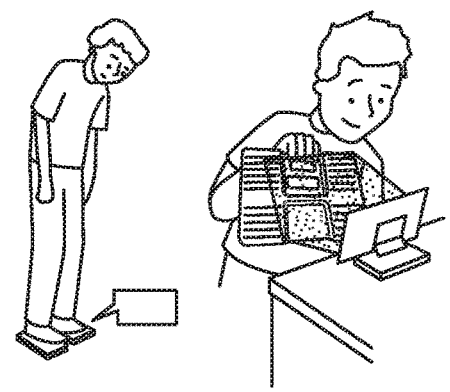
Figure 2:
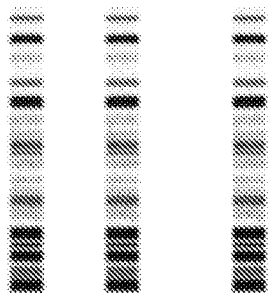
Figure 2:
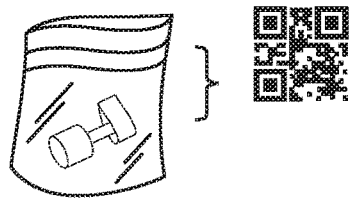
Figure 3:
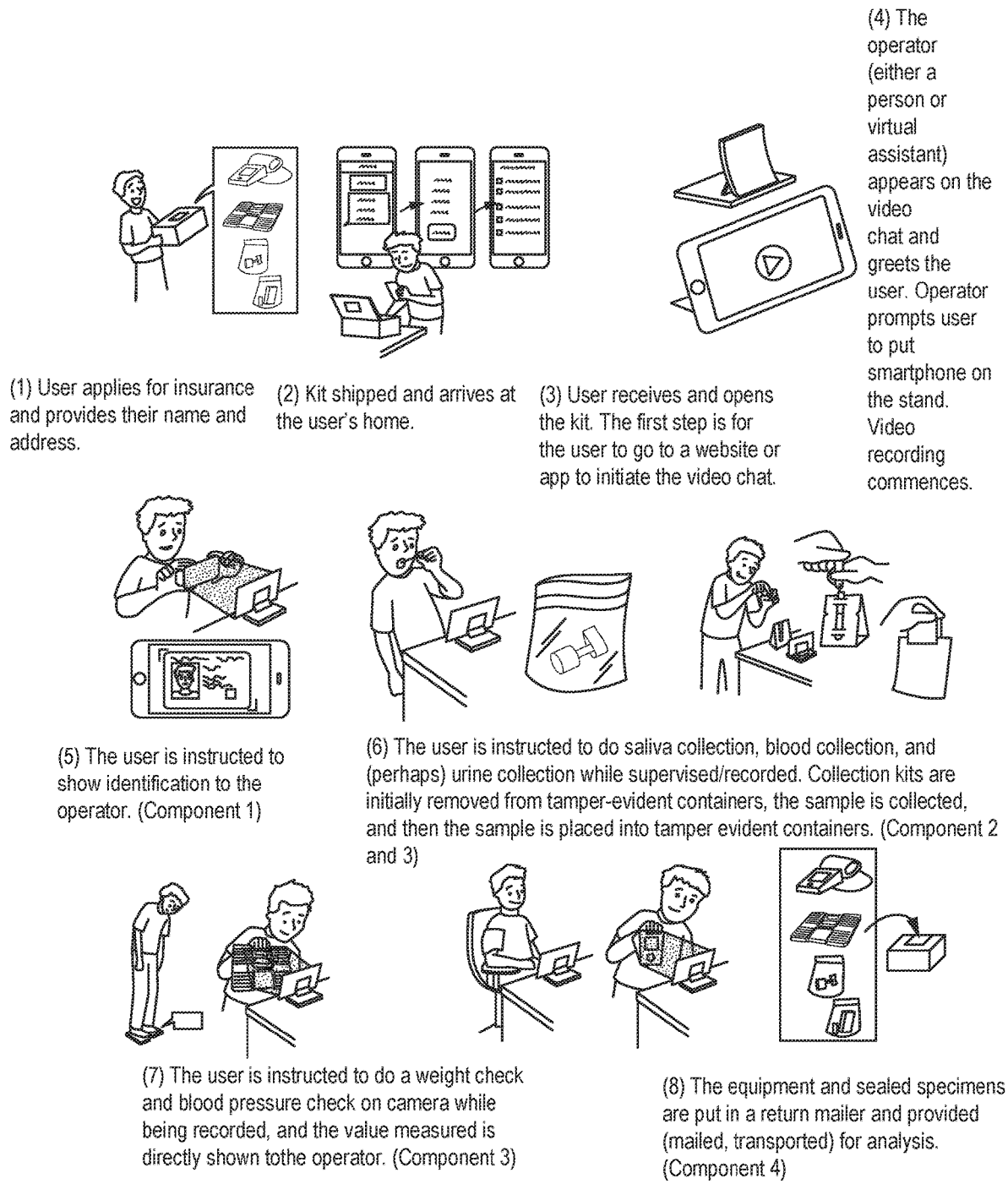
FIG. 3. is an example kit workflow from the user (intended person) experience perspective at the first location, according to embodiments of the present invention.

With reference to FIGS. 2 and 3, the registration and tracking system tracks kits offer tools for promptly and correctly collecting specimens and biological data from the intended person at a first location including their home or any place they desire to be when providing the specimens and biological data according to the instructions of the kit. In exemplary embodiments, the registration system collects identifying credentials of the intended person. For example, the identifying credentials may include demographic data, shipping address, phone number, and any other identifying credentials like driver's license number.

The system generates shipping and specimen labels and logs the identification numbers for the tamper evident specimen bags, both for pre and post-collection, provided in the kit (part of Component 4). The tracking system also stores the captured video of the user interacting with the software application program (e.g., virtual assistance) of the user performing the analysis and verification test (parts of Components 1, 2, 3 and 4). In alternative embodiments, the captured video may be of the user interacting with a human assistant.

After the kit is sent to a second location such as an analysis lab, the specimens are reviewed to determine if any of the specimen or transport packaging have any evidence of tampering. For example, the review includes confirming if the packaging seals are intact and have the same tracking numbers as those sent out with the kit (part of Component 4). By tracking the kit and the patient encounter, the registration and tracking system documents the chain of custody of the specimens and the validity of the biometric data.

(2) Video Communication

With continued reference to FIGS. 2 and 3, the video communication system documents the specimen collection and biometric data collection of the user (i.e., the intended person) at the location of the user (e.g., a home or office). The location of the user during the data collection process is referred to herein as a first location. When a user receives their kit (e.g., by mail or courier), instructions (which may be provided ahead of time by mail or online and/or with the kit), direct the user to go to a webpage on their smartphone or any computer device with a camera and internet connection, to initiate an internet communication. The internet communication establishes communication with either 1) a live or pre-recorded human assistant, or 2) a software application program that is programmed to instruct the user step-wise through the components of the kit for the specimen and biological data collection. For users not comfortable or familiar with software applications and following the steps of a software application on a computer or smartphone, the video communication may be established between the user and a live or pre-recorded human assistant. The guidance by a human assistant may be an option that is either selected when the user is ready to use the kit or the entity providing the kit to the user may offer this human assistant option prior to the user receiving the kit or starting the data collection process. For example, the kit-providing entity may offer this human assistant guidance for an additional fee.

In preferred embodiments, the internet communication is a software application that is executed from a provided website or downloaded as a software application that provides the user with step-by-step instructions using each of the components in the provided kit. With guidance from the remote human assistant or the software program assistance, the user is videoed as instructed through a smartphone, computer tablet device, or any suitable computer at the first location for the entire process. The video is recorded and stored in the (1) Registration and Tracking system as documentation of the chain of custody of the specimens. Specifically, on the video chat, the user will be instructed to show his/her identification (Component 1). He/she will be instructed to open all packages which are pre-sealed with tamper-evident containers in the view of the operator (Component 4). He/she will also be instructed to show the readings on the scale and the blood pressure cuff provided in the kit (Component 2). He/she will be instructed to collect and seal the specimens in tamper evident bags and ensure the bag is sealed on the video chat, to preserve the chain of custody (Component 3, 4). The video recording of the encounter is stored as documentation for the chain of custody. The encounter video recording is stored in the (1) Registration and Tracking system.

In some embodiments, the video communication between the user (e.g., intended person at a first location) and the assistant (human or software application program) may be a one-way video in which the assistant or program confirms presence of the user and the user receives non-video content. Examples of non-video content seen by the user include an interactive form (e.g. asking the use/person to fill out their weight after being recorded on the scale), text (e.g. reading and/or electronically signing legal text such as declarations and/or terms and conditions), and non-live video (e.g. like a tutorial video for the next collection step while they are obtaining a specimen for example, soaking a saliva sponge in their mouth).

As used herein, a tamper-evident container includes any suitable type known in the art. Examples of tamper-evident containers include a tamper-evident security bag, a tamper-evident tape or seal for a container, or a tamper-evident ring or band for a container. See Rosette, J L (2009), "Tamper-Evident Packaging". in Yarn, K L (ed.), *Encyclopedia of Packaging Technology*, Wiley (published 2010), ISBN 978-0-470-08704-6; US 2006/0066096 to Kan et al.; US 2005/0036716 to Geyer; and U.S. Pat. No. 5,631,068 to Smith. One skilled in the art may determine the specific type of tamper-evident container that is suitable for the type of specimen to be collected and any needed specimen extraction device that may need to be packaged in the specific tamper-evident container.

(3) Collection Kit

The collection kit is personalized to the user and is sent with all the materials needed by the user to their location—e.g., home or office. Typically, the kit includes a unique code labeled on the kit corresponding to the intended person (e.g., user) for the kit. As used herein, a unique code is any visual code that uniquely identifies an object. The unique visual code may be an alphanumeric code, a linear code, or a matrix barcode. Matrix barcodes are also referred to as two-dimensional barcodes known under the trademark of Quick Response™ (QR) code.

With reference to FIG. 1, in typical embodiments, the kit includes instructions and return packaging materials, and at least one data or specimen collecting device. The kit my also include a smartphone stand. While many users may have a stand for propping up the smart device to be used, for convenience, the smartphone stand may be provided whether or not the user has their own. The data or specimen collecting devices include: a fingerprick blood collection device, blood pressure cuff, weight scale, saliva collection device, a muscosal/nasal swab collection device, stool sampling device, and/or hair sample device (e.g., vessel or container).

Instructions. The instructions provide a website or a link to download the software application program assistance for the users do go to start the video communication. The instructions also provide an overview of the process that includes all of the particular steps in the process: the weight check, blood pressure check, saliva collection, mucosal collection (e.g., nasal swab), blood (fingerprick) collection, and urine collection. In preferred embodiments, after the user is connected to the software application or a human assistant (live or pre-recorded), each of the components in the kit may have a corresponding set of instructions for use which are duplicative or overlapping with the instructions provided by the software application or human assistant. While not all kits will have all the components disclosed herein, each component provided will have a corresponding set of instructions which are at least provided by the verification assistant (i.e., the software application program or the human assistant). As readily understood by the skilled person, the instructed process provided to the user by the software application program and/or a human assistant will be provided in a particular order; however with the exception of propping up a smartphone (using user's stand or a provided stand) and packaging the collected specimens for return, the order of collecting the data and specimens may be in any order and is not limited to the order as presented herein. In order for the components in the kit to be easy to use and identify with the provided corresponding instructions (e.g., written instructions and instructions provided by the software assistance or human assistant), a particular order is disclosed such that each step can be verified and is carried out by the user most effectively. Moreover, while the presently disclosed method includes the order of steps the user follows (as captured on video) to correspond to the order set forth in the provided instructions, so long as the order carried out by the user follows the provided instructions, the order of steps after the smartphone/smart device set up and before the packaging of collected specimens for return, may be in any order.

In notable embodiments, the order of steps is not limited to all of the steps as disclosed herein. The steps as exemplified herein encompass one of the many options for the ordering of steps as would be readily understood by the skilled person. For example, an insurance provider may want to provide a kit having all of the disclosed components or most of the disclosed components and include all or most of the steps to collect biological data and specimens. In additional embodiments, a kit may be provided as a coronavirus testing kit including a mucosal (nasal swab) collection device together with the instructions, smartphone stand, and return packaging materials. As a healthcare provider would select a particular panel of testing to be done in person including body weight, blood pressure, blood, urine, saliva, stool, hair, and/or nasal swabbing, components of the kit may also include the desired components and corresponding instructions.

Smartphone stand. After the user initiates the video chat, they will be instructed to set up a smartphone stand on a table, for example, about an arms-length away from the edge of the table so that the camera can see and record the specimen collection. As used herein, the smartphone stand may be used to prop up any smart computer device having a video camera and capable of connecting to the internet. As disclosed herein, the smartphone stand may not be necessary if the user has a stand for their smart device that is effective to capture the required video communication. As such, the smartphone stand may be an optional component for the kit. Additionally, the smartphone stand may be included in the kit whether or not it is needed by the user.

Scale. A small weighing scale (pre-sealed in tamper-evident container) will be provided to the user with the kit and the user will be instructed to stand on it and show the readout to the operator on camera for verification (Component 2).

Blood pressure cuff. The blood pressure cuff (pre-sealed in a tamper-evident container) will be provided to the user and the operator will instruct them to use it and show the result to the camera (Component 2).

Saliva collection device. A saliva collection device (pre-sealed in a tamper-evident container) will be provided in the kit and the collection will be recorded with guidance from the operator. Once saliva collection is complete, the saliva kit is placed in a tamper evident bag (or equivalent tamper-evident container) with a serial number (number stored in the Registration and Tracking system for verification) and placement in the bag is recorded, to verify the chain of custody (Component 3, 4).

Blood collection device. The blood collection device (pre-sealed in a tamper-evident container) will be provided in the kit and collection will be recorded with guidance from the operator. Typically, the blood collection device is a finger prick assembly. The user will be instructed to use a lancet to prick his/her finger and then collect the expressed blood into a capillary collection device while the operator is giving guidance and recording the collection. Once blood collection is complete, the blood sample is placed in a tamper evident bag (or equivalent tamper-evident container) with serial number (number stored in the Registration and Tracking system for verification) and placement in the bag is recorded, to verify the chain of custody (Component 3, 4).

Urine collection device. A urine collection device (pre-sealed in a tamper-evident container) will be provided in the kit and collection will be recorded with guidance from the operator. Due to the sensitivity of urine collection, collection will likely not be performed during video recording. Once urine collection is complete, the urine sample is placed in a tamper evident bag (or equivalent tamper-evident container) with serial number (number stored in the Registration and Tracking system for verification) and placement in the bag is recorded, to verify the chain of custody (Component 4).

During the (4) Lab Process the urine can be matched to the other samples (blood, saliva) using DNA fingerprinting (Component 5).

Mucosal/nasal swabbing. In additional embodiments, the kit may additionally or alternatively include a mucosal collection device. Collection of a mucosal sample from a nasal sampling may be included in a kit for testing for mucosal infections such as those caused by betacoronaviruses—e.g., MERS-CoV, SARS-CoV, and SARS-CoV2, the latter causing the current COVID-19 disease. The muscosal collection device may include nasal swabs for unassisted mid-nasal swabbing as described and reported, e.g., McCulloch of al., *JAMA Netw Open.* 2020 July; 3(7): e2016382.

Stool sampling. In some embodiments, the kit may include a stool collection device including instructions for obtaining the stool sampling and placing the sample in a collection vessel including preserving solution. Any suitable stool collection sampling instructions and container may be used as known, used, and distributed for at-home use in the healthcare industry.

Hair sample. In some embodiments, a hair sample from the person may be obtained from the person's body and provided in a labeled container. Accordingly, the kit may contain a suitable vessel container for collecting and packaging the hair sample.

Return packaging. After the collection is complete the saliva, blood, mucosal sample, and/or urine specimens, in their respective tamper evident systems are returned to the box they came in. In some embodiments, the scale, blood pressure cuff, and phone stand are also returned to the box they came in. The box is placed in a return packaging provided in the kit and sent back to the lab either by mail, courier, or may be delivered by the user. Preferably, the box is mailed or sent by courier.

(4) Example Analysis/Lab Process

The lab or analysis process has 2 main goals (1) to determine an individual's health status for pricing and underwriting, (2) to authenticate the sample. Once the return kit has been placed in the return mailer and shipped back to the lab, the received items are analyzed in accordance with the two goals.

Figure 4:
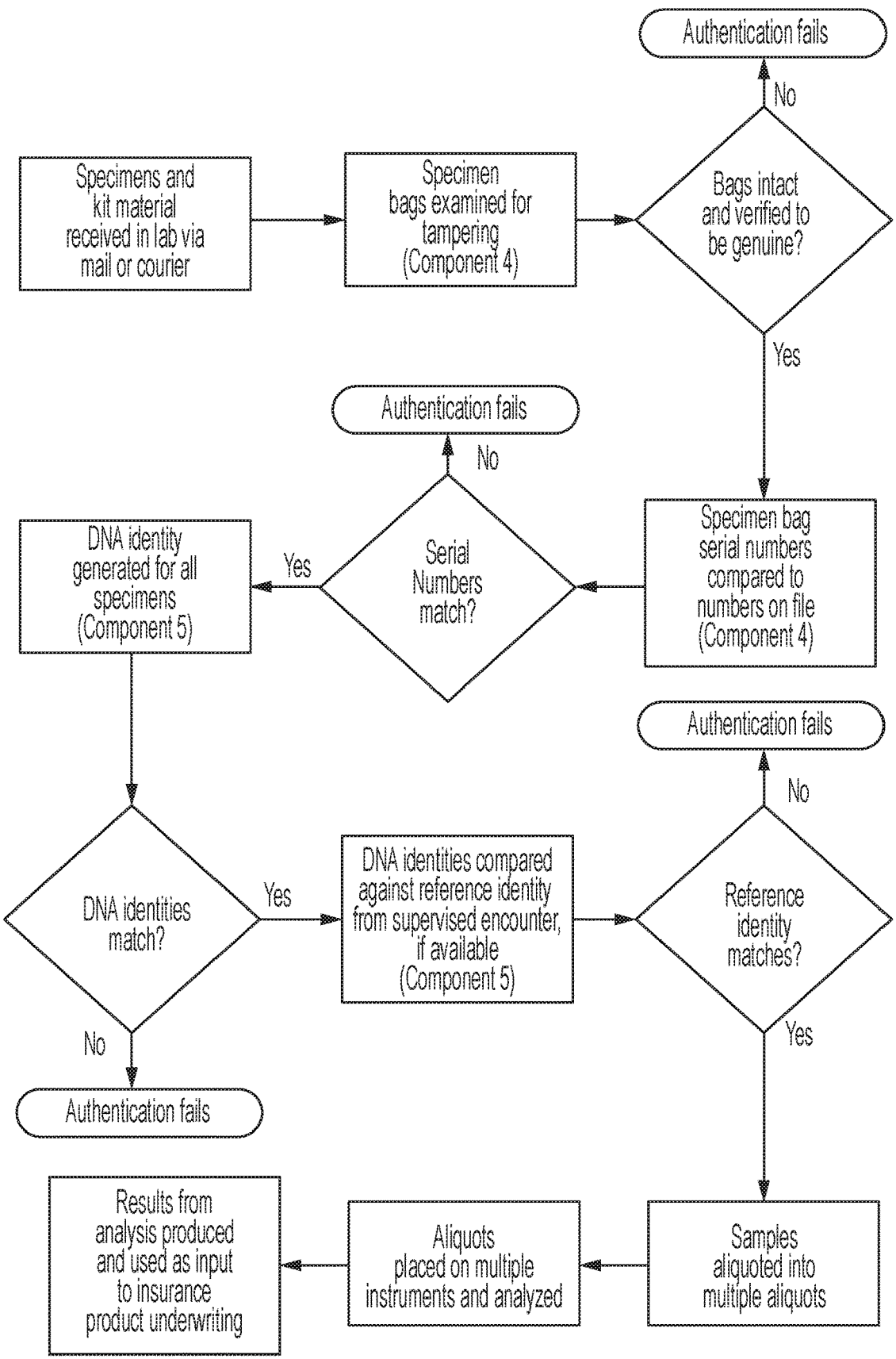
FIG. 4. is a schematic of an example kit workflow method once the kit is provided to the second location for analysis.
Figure 5:
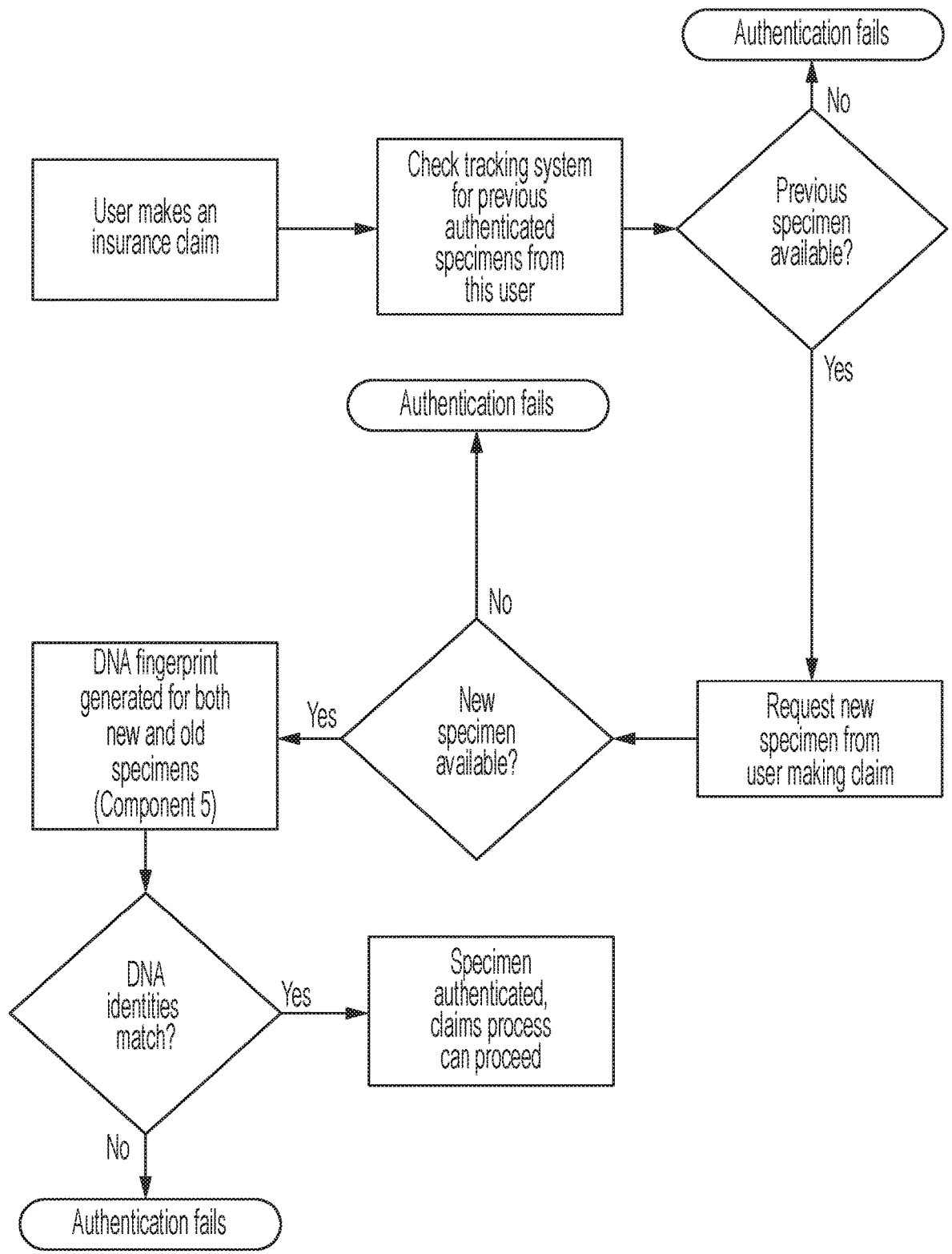
FIG. 5 is a schematic of an example insurance claim process and authentication according to presently disclosed and claimed processes.

With reference to FIGS. 4-5, the first step (a) in the lab process is to verify that the specimen bags are intact. The laboratory technician opens the package and photographs the specimens, documenting the status of the specimen bags, i.e. whether they are intact or not (Component 4). Next the technician verifies that the bags sent back have the same serial number as those sent out by checking the (1) Registration and Tracking system (Component 4).

In step (b), the lab technicians then open the specimen bags and start processing the samples. The saliva, blood and urine samples are aliquoted into several parts each, including one aliquot for authentication testing. Authentication testing may include DNA analysis (e.g., also referred to as a DNA fingerprint) for each of the samples. (As understood in the art, RNA analysis may be performed instead of DNA analysis.) The three DNA fingerprints are compared to ensure that the samples came from the same person (Component 5). If the samples do not come from the same person, that kit fails quality assurance and the results cannot be used. In an additional embodiment, DNA analysis may also be performed on reference sample (also referred to as a verification sample), collected from a previous encounter with the intended person/user. Accordingly, if any of the DNA profiles from the samples do not match, the authentication fails.

In step (c), the remaining specimen aliquots are then run on laboratory analyzers to determine health status. For example, a blood sample can be used to test a user's hemoglobin A1c, triglycerides, disease status or drug use status. The results of the laboratory tests are stored in the (1) Registration and Tracking system.

In step (d), the results from the lab tests are used to model risk and price an insurance product for the individual tested.

The discussion provided herein provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc.

What is claimed is:

1. A method for obtaining a specimen and/or biological information from a person at a first location to be provided to a second location with the person being verified as an intended person, the method comprising:

establishing a video communication between the person and a human or virtual verification assistant;

confirming identification of the person as being the intended person to the verification assistant through the video communication;

videoing a preassigned unique code corresponding to the intended person on a coded collection device that contains the preassigned unique code and is to be used by the intended person at the first location and/or videoing removal of a collection device from a coded tamper-evident container containing the preassigned unique code; and obtaining one or more specimens from the intended person and/or obtaining one or more types of biological information of the intended person, wherein the obtaining the one or more specimens of the intended person comprises at least one of:

i) videoing the intended person while obtaining the one or more specimens;

ii) videoing the one or more specimens after collecting being placed into the coded collection device; or iii) videoing the one or more specimens being placed in the coded tamper-evident sample container; and wherein the obtaining the one or more types of biological information of the intended person comprises:

videoing the intended person while obtaining the one or more types of biological information of the intended person.

2. The method of claim 1, comprising videoing the preassigned unique code on the coded collection device to be used by the intended person at the first location and/or videoing removal of the collection device from the coded tamper-evident container.

3. The method of claim 1, wherein the one or more specimens are selected from a blood sample, a saliva sample, nasal secretion sample, a urine sample, a mucosal sample, a stool sample, or a hair sample.

4. The method of claim 1, wherein at least one type of biological information of the intended person is selected from weight, height, and/or blood pressure.

5. The method of claim 1, wherein the video communication comprises an internet or cellular connection through a computer, a smartphone, or a telephone.

6. The method of claim 1, wherein the verification assistant is a software application program or a human person.

7. The method of claim 1, wherein the coded tamper-evident container comprises a specimen device for extracting the one or more specimens from the intended person and a coded, sealable packaging for sealing the extracted one or more specimens.

8. The method of claim 7, wherein the specimen device and the extracted one or more specimens thereon are sealed within the coded sealable packaging.

9. The method of claim 7, wherein the coded tamper-evident container comprises a specimen device for each of the one or more specimens.

10. The method of claim 7, wherein the videoing of the intended person or the one or more obtained specimens comprises a specimen selected from a blood sample, a saliva sample, a nasal secretion sample, a urine sample, a stool sample, a mucosal sample, or a hair sample.

11. The method of claim 7, wherein the preassigned unique code on the specimen device is recorded through the videoing.

12. The method of claim 1, wherein at least one of the one or more specimens are comparatively analyzed with another of the one or more specimens or with a verification sample from the intended person to determine if the one or more specimens were obtained from the intended person.

13. The method of claim 12, wherein the obtaining of at least one or more specimens of the intended person comprises videoing the intended person obtaining the specimen.

14. The method of claim 12, wherein the comparative analysis comprises DNA and/or RNA analysis of the at least one of the one or more specimens and the other of the one or more specimens.

15. The method of claim 1, wherein the one or more specimens obtained at the first location are transported to the second location.

16. The method of claim 1, wherein the one or more types of biological information are submitted from a device at the first location to a device at a second location.

17. The method of claim 1, wherein the one or more specimens comprise at least one selected from a blood sample, a saliva sample, a nasal secretion sample, a urine sample, a stool sample, or a hair sample.

18. The method of claim 1, wherein the one or more types of biological information comprise at least blood pressure.

19. The method of claim 1, wherein the one or more types of biological information comprise at least blood pressure and weight.

20. The method of claim 1, wherein the one or more types of biological information comprise at least blood pressure, weight, and height.

21. A method of verifying a specimen and/or biological information obtained from a person at a first location to be provided to a second location with the person being verified as an intended person and the specimen and/or biological information being verified as obtained from the intended person, the method comprising:
    establishing an internet communication between the person and a verification assistant;
    confirming identification of the person as being the intended person to the verification assistant through the internet communication;
    videoing a preassigned unique code corresponding to the intended person on a coded collection device that contains the preassigned unique code and is to be used by the intended person at the first location and/or videoing removal of a collection device from a coded tamper-evident container containing the preassigned unique code; and
    optionally videoing the intended person while obtaining one or more specimens from the intended person or one or more types of biological information of the intended person,
    wherein the obtaining the one or more specimens from the intended person comprises placing the one or more specimens after collecting in the coded collection device or in the coded tamper-evident sample container; and
    wherein the obtaining the one or more types of biological information of the intended person comprises:
    videoing the intended person while obtaining the one or more types of biological information of the intended person.

22. The method of claim 21, wherein the one or more specimens are selected from a blood sample, a saliva sample, a nasal secretion sample, a urine sample, a stool sample, or a hair sample.

23. The method of claim 21, wherein at least one type of biological information of the intended person is selected from weight, height, or blood pressure.

24. The method of claim 21, wherein the videoing comprises an internet or cellular connection through a computer, a smartphone, or a telephone.

25. The method of claim 21, wherein the verification assistant is a software application program or a human assistant.

26. The method of claim 21, wherein the tamper-evident sample container comprises a specimen device for extracting the one or more specimens from the intended person and a coded, tamper-evident, sealable packaging for sealing the extracted one or more specimens.

27. The method of claim 26, wherein the specimen device and the extracted one or more specimens thereon are sealed within the coded, tamper-evident, sealable packaging.

28. The method of claim 21, wherein the one or more specimens and/or the one or more types of biological information of the intended person is comparatively analyzed to a sample from the intended person to determine if the one or more specimens and/or the one or more types of biological information were obtained. from the intended person.

29. The method of claim 28, wherein the sample from the intended person is collected with an identity verification authority.

30. The method of claim 21, wherein the internet communication comprises a video received by the verification assistant and non-video content received by the person.

31. A kit for collecting a verified specimen and/or verified biological information from an intended person at a first location to be provided to a second location, the person at the time of said collecting being verified as the intended person, the kit comprising:
- a preassigned unique code labeled on the kit corresponding to the intended person;
- instructions for establishing communication with a verification assistant; and
- at least one of a blood extraction device, a saliva collection device, a nasal secretion collection device, a urine collection device, a stool sample collection device, or a hair sample device.

32. The kit of claim 31, further comprising a weighing scale.

33. The kit of claim 31, further comprising a urine specimen container.

34. The kit of claim 31, further comprising a coded, tamper-evident, sealable sample container for at least one of the following: the blood extraction device, the saliva collection device, the nasal secretion collection device, the urine collection device, the stool sample collection device, the mucous collection device, or the hair collection device.

35. The kit of claim 31, further comprising a mailing bag or box for mailing or transporting the specimen and/or verified biological information after collecting to the second location.

36. The kit of claim 31, further comprising a stand for propping up a computer, a smartphone, or a telephone for the intended person for internet communication with the verification assistant.

37. The kit of claim 31, further comprising a height measure.

38. The kit of claim 31, further comprising a blood pressure monitor.

39. A method for obtaining a specimen and/or biological information from a person at a first location to be provided to a second location with the person being verified as an intended person, the method comprising:
- a) providing an intended user with a kit comprising:
  - i) at least one of a coded collection device containing a code or a coded tamper-evident container containing a code;
  - ii) instructions for establishing communication with a verification assistant; and
  - iii) at least one of a blood extraction device, a saliva collection device, a nasal secretion collection device, a urine collection device, a stool sample collection device, or a hair sample device;
- b) preassigning the code to the intended person to establish a kit comprising at least one of a coded collection device containing a preassigned unique code corresponding to the intended person or a coded tamper-evident container containing a preassigned unique code corresponding to the intended person;
- c) establishing a video communication between the intended person and a human or virtual verification assistant;
- d) confirming identification of the intended person to the verification assistant through the video communication;
- e) videoing the preassigned unique code corresponding to the intended person on the coded collection device that contains the preassigned unique code at the first location and/or videoing removal of a collection device from the coded tamper-evident container containing the preassigned unique code; and
- f) obtaining one or more specimens from the intended person and/or obtaining one or more types of biological information of the intended person, wherein the obtaining the one or more specimens of the intended person comprises at least one of:
- i) videoing the intended person while obtaining the one or more specimens;
- ii) videoing the one or more specimens after collecting being placed into the coded collection device; or
- iii) videoing the one or more specimens being placed in the coded tamper-evident sample container; and wherein the obtaining the one or more types of biological information of the intended person comprises:
- videoing the intended person while obtaining the one or more types of biological information of the intended person.

* * * * *